United States Patent
Fan et al.

(10) Patent No.: US 10,545,671 B1
(45) Date of Patent: Jan. 28, 2020

(54) MAPPING BETWEEN VOLUME DATA BLOCK AND FILE DATA BLOCK SYSTEM AND METHOD

(71) Applicant: EMC IP Holding Company, LLC, Hopkinton, MA (US)

(72) Inventors: Xiaohua Fan, Shanghai (CN); Yaming Kuang, Shanghai (CN); Walter Forrester, Berkeley Heights, NJ (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 187 days.

(21) Appl. No.: 15/664,174

(22) Filed: Jul. 31, 2017

(51) Int. Cl.
*G06F 9/355* (2018.01)
*G06F 3/06* (2006.01)
*G06F 12/1036* (2016.01)
*G06F 12/02* (2006.01)

(52) U.S. Cl.
CPC ............ *G06F 3/0608* (2013.01); *G06F 3/067* (2013.01); *G06F 3/0631* (2013.01); *G06F 12/02* (2013.01); *G06F 12/1036* (2013.01); *G06F 9/355* (2013.01); *G06F 2212/401* (2013.01); *G06F 2212/65* (2013.01)

(58) Field of Classification Search
None
See application file for complete search history.

(56) References Cited

U.S. PATENT DOCUMENTS

| | | | |
|---|---|---|---|
| 8,578,128 B1 * | 11/2013 | Davenport | G06F 16/10 711/202 |
| 9,615,500 B2 * | 4/2017 | Sudbrink | A01B 73/046 |
| 2018/0364949 A1 * | 12/2018 | Aston | G06F 3/0661 |

* cited by examiner

*Primary Examiner* — Brian R Peugh
(74) *Attorney, Agent, or Firm* — Brian J. Colandreo; Mark H. Whittenberger; Holland & Knight LLP

(57) ABSTRACT

A method, computer program product, and computer system for receiving, at a computing device, an I/O request directed to a compressed data portion of a storage system. It may be determined whether the I/O request includes one of a first portion of information and a second portion of information. An address of the compressed data portion may be obtained via downward mapping if the I/O request includes the first portion of information. The address of the compressed data portion may be obtained via upward mapping if the I/O request includes the second portion of information. The I/O request may be executed at the compressed data portion.

20 Claims, 7 Drawing Sheets

MAPPING BETWEEN VOLUME DATA BLOCK AND FILE DATA BLOCK SYSTEM AND METHOD

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, at a computing device, an I/O request directed to a compressed data portion of a storage system. It may be determined whether the I/O request includes one of a first portion of information and a second portion of information. An address of the compressed data portion may be obtained via downward mapping if the I/O request includes the first portion of information. The address of the compressed data portion may be obtained via upward mapping if the I/O request includes the second portion of information. The I/O request may be executed at the compressed data portion.

One or more of the following example features may be included. The first portion of information may include a file system ID, an inode number, and a file block offset. Obtaining the address of the compressed data portion via downward mapping may include locating a mapping pointer that points to compression Virtual Block Metadata, wherein the compression Virtual Block Metadata may include a Zip-Header with a plurality of file offsets. Obtaining the address of the compressed data portion via downward mapping may further include obtaining at least one file offset of the plurality of file offsets, and at least one byte offset. The second portion of information may include an address of a compressed data block in a data volume. Obtaining the address of the compressed data portion via upward mapping may include obtaining a compression Virtual Block Metadata address from a block metadata in which the compressed data portion resides. Obtaining the address of the compressed data portion via upward mapping may further include verifying a mapping to the compressed data portion using an inode number and file block offset pair.

In another example implementation, a computing system may include one or more processors and one or more memories configured to perform operations that may include but are not limited to receiving an I/O request directed to a compressed data portion of a storage system. It may be determined whether the I/O request includes one of a first portion of information and a second portion of information. An address of the compressed data portion may be obtained via downward mapping if the I/O request includes the first portion of information. The address of the compressed data portion may be obtained via upward mapping if the I/O request includes the second portion of information. The I/O request may be executed at the compressed data portion.

One or more of the following example features may be included. The first portion of information may include a file system ID, an inode number, and a file block offset. Obtaining the address of the compressed data portion via downward mapping may include locating a mapping pointer that points to compression Virtual Block Metadata, wherein the compression Virtual Block Metadata may include a Zip-Header with a plurality of file offsets. Obtaining the address of the compressed data portion via downward mapping may further include obtaining at least one file offset of the plurality of file offsets, and at least one byte offset. The second portion of information may include an address of a compressed data block in a data volume. Obtaining the address of the compressed data portion via upward mapping may include obtaining a compression Virtual Block Metadata address from a block metadata in which the compressed data portion resides. Obtaining the address of the compressed data portion via upward mapping may further include verifying a mapping to the compressed data portion using an inode number and file block offset pair.

In another example implementation, a computer program product may reside on a computer readable storage medium having a plurality of instructions stored thereon which, when executed across one or more processors, may cause at least a portion of the one or more processors to perform operations that may include but are not limited to receiving an I/O request directed to a compressed data portion of a storage system. It may be determined whether the I/O request includes one of a first portion of information and a second portion of information. An address of the compressed data portion may be obtained via downward mapping if the I/O request includes the first portion of information. The address of the compressed data portion may be obtained via upward mapping if the I/O request includes the second portion of information. The I/O request may be executed at the compressed data portion.

One or more of the following example features may be included. The first portion of information may include a file system ID, an inode number, and a file block offset. Obtaining the address of the compressed data portion via downward mapping may include locating a mapping pointer that points to compression Virtual Block Metadata, wherein the compression Virtual Block Metadata may include a Zip-Header with a plurality of file offsets. Obtaining the address of the compressed data portion via downward mapping may further include obtaining at least one file offset of the plurality of file offsets, and at least one byte offset. The second portion of information may include an address of a compressed data block in a data volume. Obtaining the address of the compressed data portion via upward mapping may include obtaining a compression Virtual Block Metadata address from a block metadata in which the compressed data portion resides. Obtaining the address of the compressed data portion via upward mapping may further include verifying a mapping to the compressed data portion using an inode number and file block offset pair.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
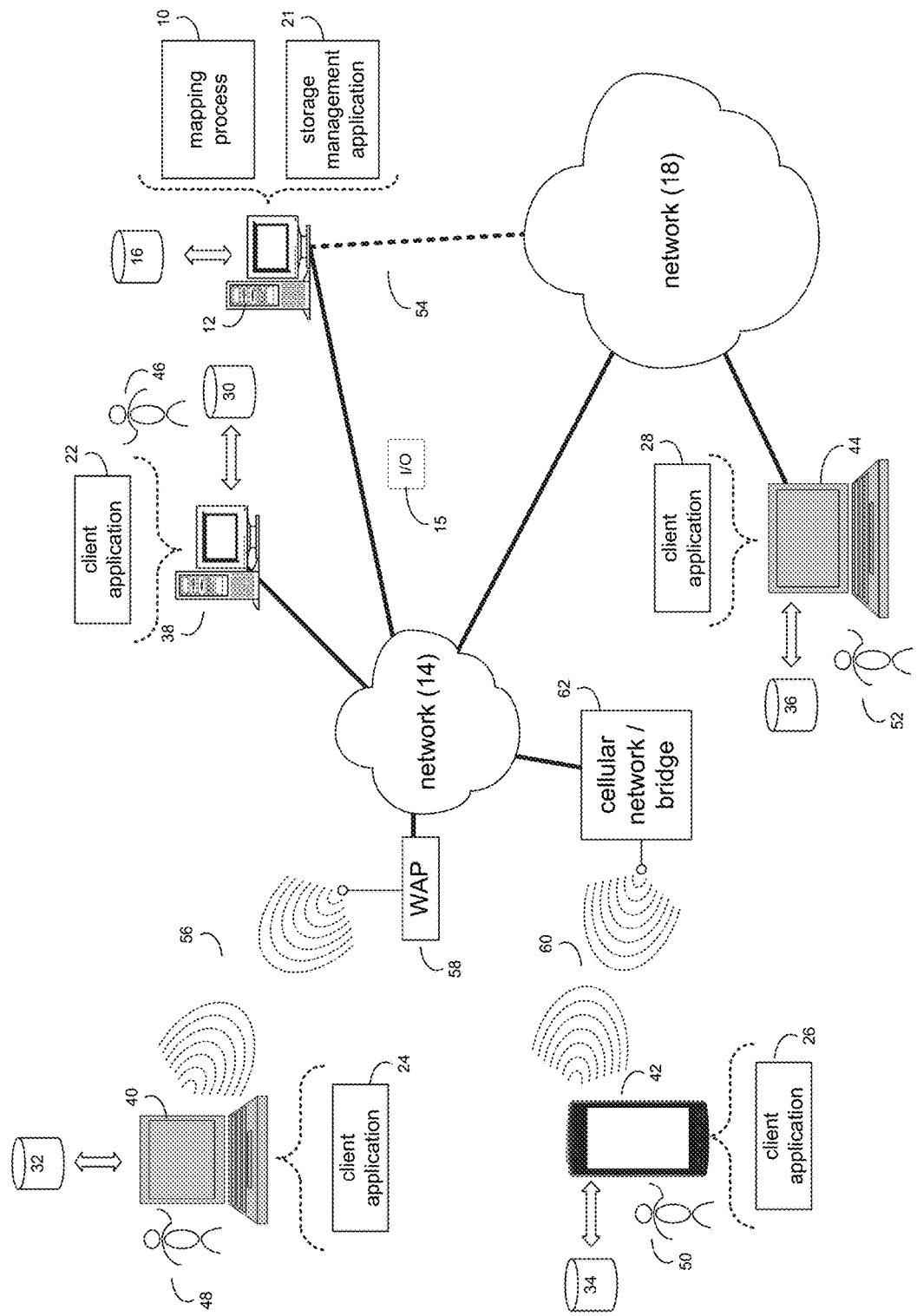
FIG. 1 is an example diagrammatic view of a mapping process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown mapping process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an mapping process, such as mapping process 10 of FIG. 1, may receive, at a computing device, an I/O request directed to a compressed data portion of a storage system. It may be determined whether the I/O request includes one of a first portion of information and a second portion of information. An address of the compressed data portion may be obtained via downward mapping if the I/O request includes the first portion of information. The address of the compressed data portion may be obtained via upward mapping if the I/O request includes the second portion of information. The I/O request may be executed at the compressed data portion.

In some implementations, the instruction sets and subroutines of mapping process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, mapping process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, mapping process 10 and/or storage management application 21 may be accessed via one or more of client applications 22, 24, 26, 28. In some implementations, mapping process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within mapping process 10, a component of mapping process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of mapping process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of mapping process 10 (and vice versa). Accordingly, in some implementations, mapping process 10 may be a purely server-side application, a purely client-side application, or a hybrid server-side/client-side application that is cooperatively executed by one or more of client applications 22, 24, 26, 28 and/or mapping process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, mapping process 10, and storage management application 21, taken singly or in any combination, may effectuate some or all of the same functionality, any description of effectuating such functionality via one or more of client applications 22, 24, 26, 28, mapping process 10, storage management application 21, or combination thereof, and any described interaction(s) between one or more of client applications 22, 24, 26, 28, mapping process 10, storage management application 21, or combination thereof to effectuate such functionality, should be taken as an example only and not to limit the scope of the disclosure.

In some implementations, one or more of users 46, 48, 50, 52 may access computer 12 and mapping process 10 (e.g., using one or more of client electronic devices 38, 40, 42, 44) directly through network 14 or through secondary network 18. Further, computer 12 may be connected to network 14 through secondary network 18, as illustrated with phantom link line 54. Mapping process 10 may include one or more user interfaces, such as browsers and textual or graphical user interfaces, through which users 46, 48, 50, 52 may access mapping process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
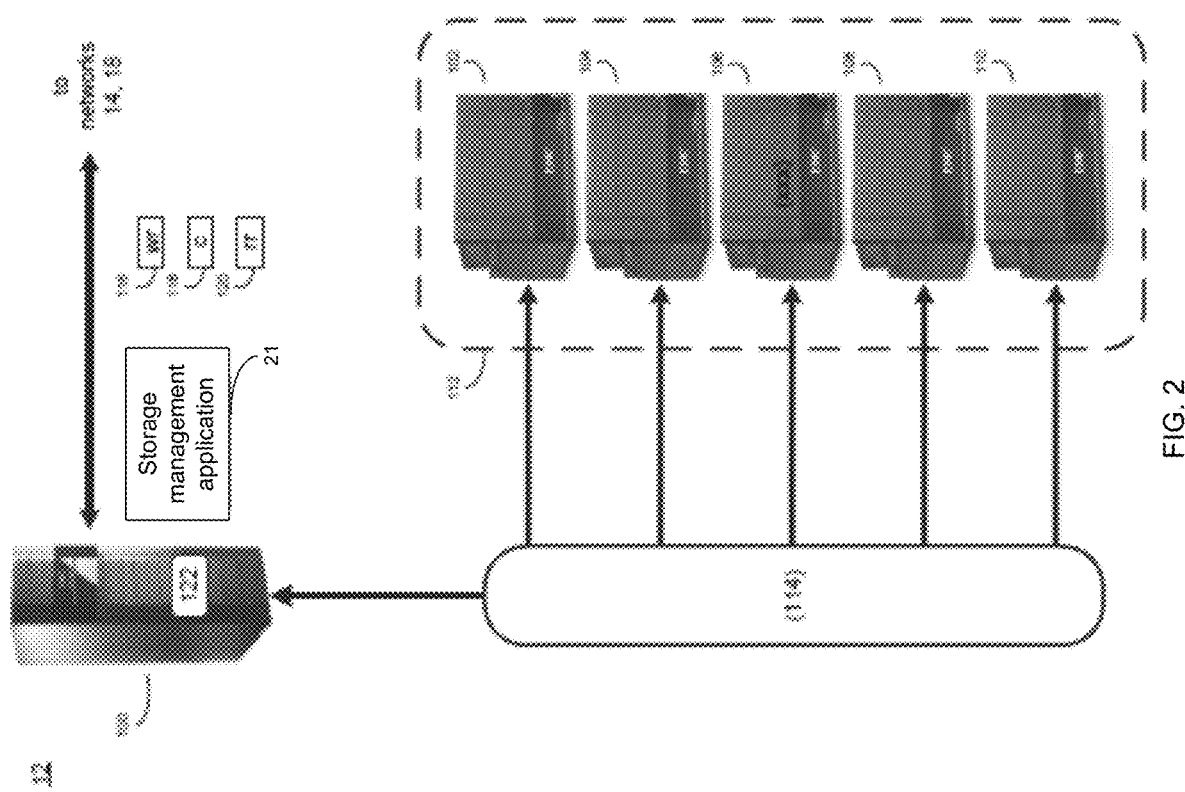
FIG. 2 is an example diagrammatic view of a computer of FIG. 1 according to one or more example implementations of the disclosure.
Figure 3:
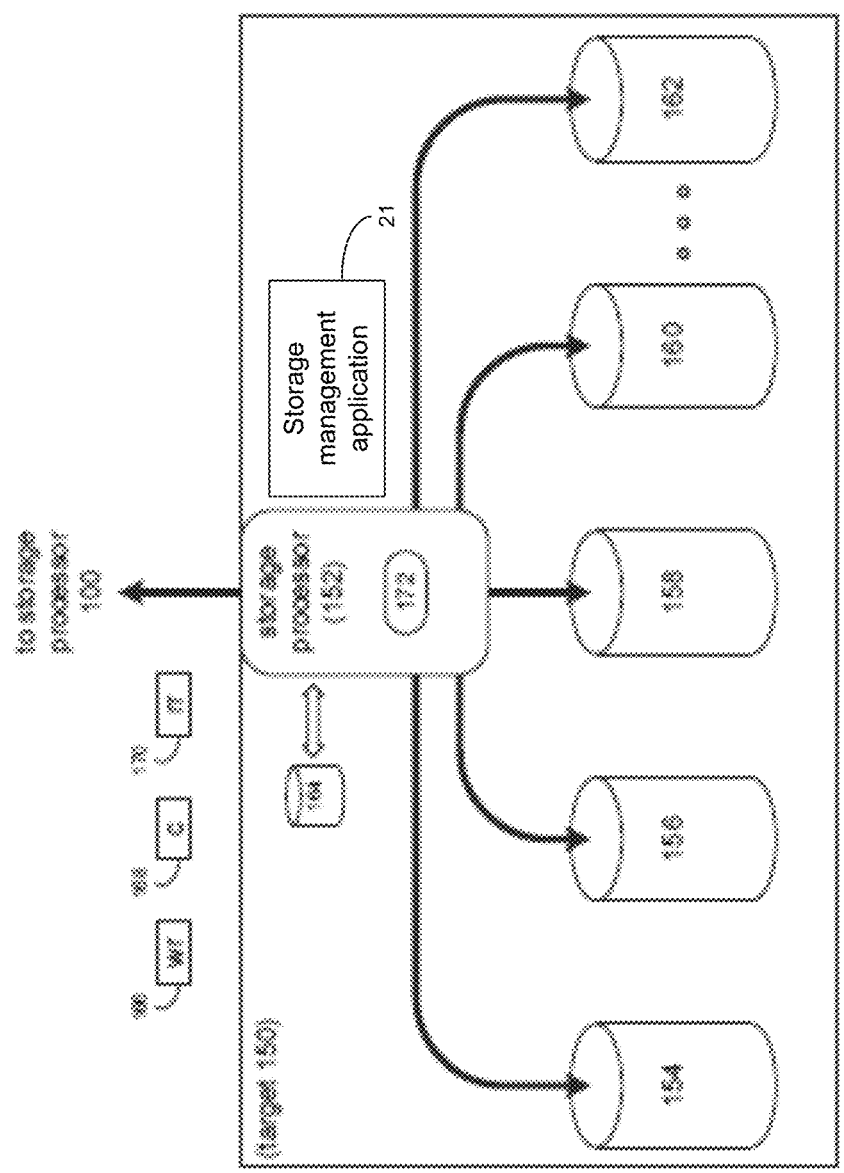
FIG. 3 is an example diagrammatic view of a storage target of FIG. 2 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or mapping process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
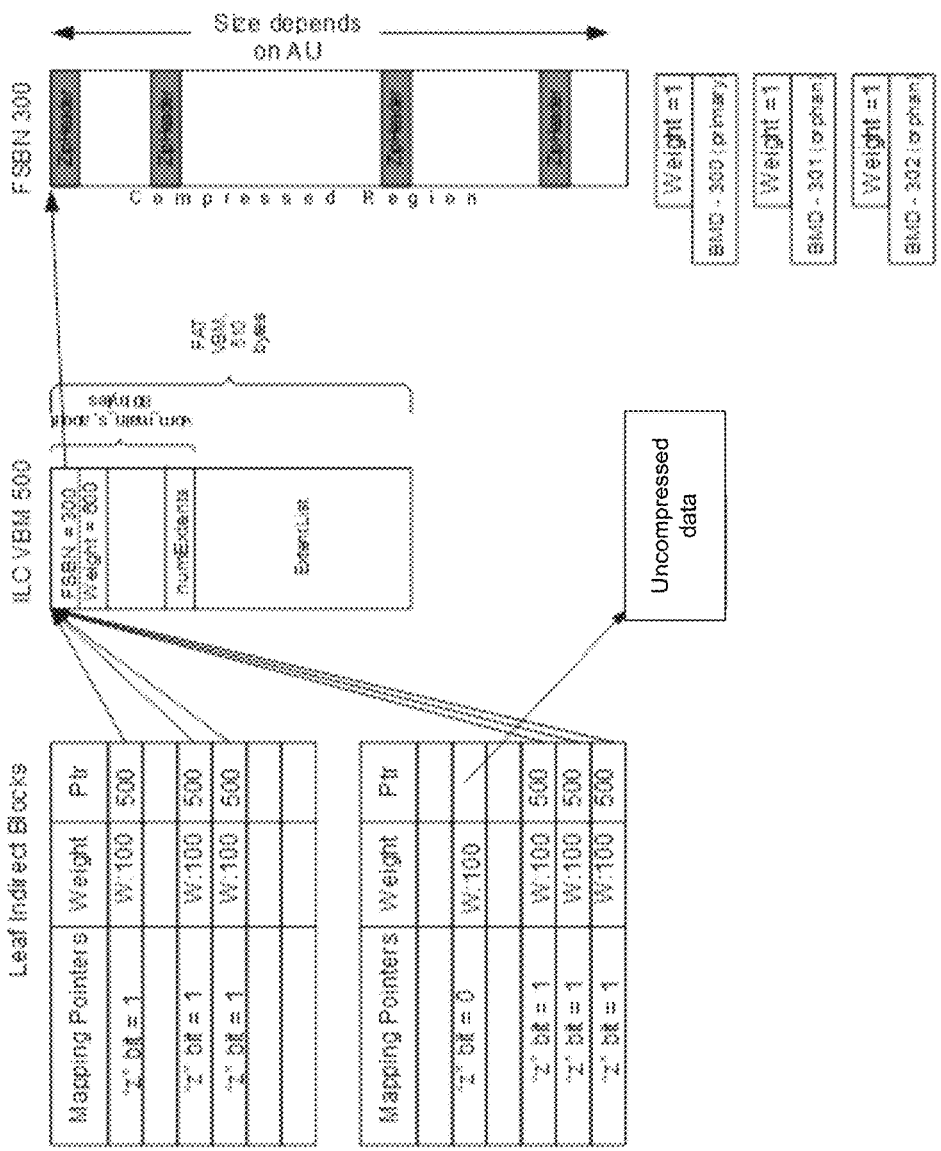
FIG. 4 is an example diagrammatic view of a file system layout according to one or more example implementations of the disclosure.

Referring also to the example implementation of FIG. 4, there is shown a diagrammatic view of an example file system layout 400. In some implementations, storage management application 21 may implement an Inline Compression (ILC) feature. ILC may provide the ability to reduce the amount of storage needed for user data on a storage device by compressing portions of the data at the time the data is first written. To support this feature, at least in part, file system layout 400 may include a ILC Virtual Block Metadata (VBM) and compressed data segment to hold the compressed data. Each compressed data portion may be associated with an extent stored in the Extent List inside the ILC VBM. To support recoverability of the ILC VBM, e.g., in the case when a cyclic redundancy check (CRC) or other error detecting technique of the ILC VBMs are all bad), there may be a ZipHeader in the beginning of every compressed data portion.

As will be discussed below, mapping process 10 may at least help, e.g., improvement data storage technology, necessarily rooted in computer technology in order to overcome an example and non-limiting problem specifically arising in the realm of storage systems associated with, e.g., upward and downward mapping of volume data block/file data block data, not only for non-compressed data blocks, but also for compressed data blocks.

Figure 5:
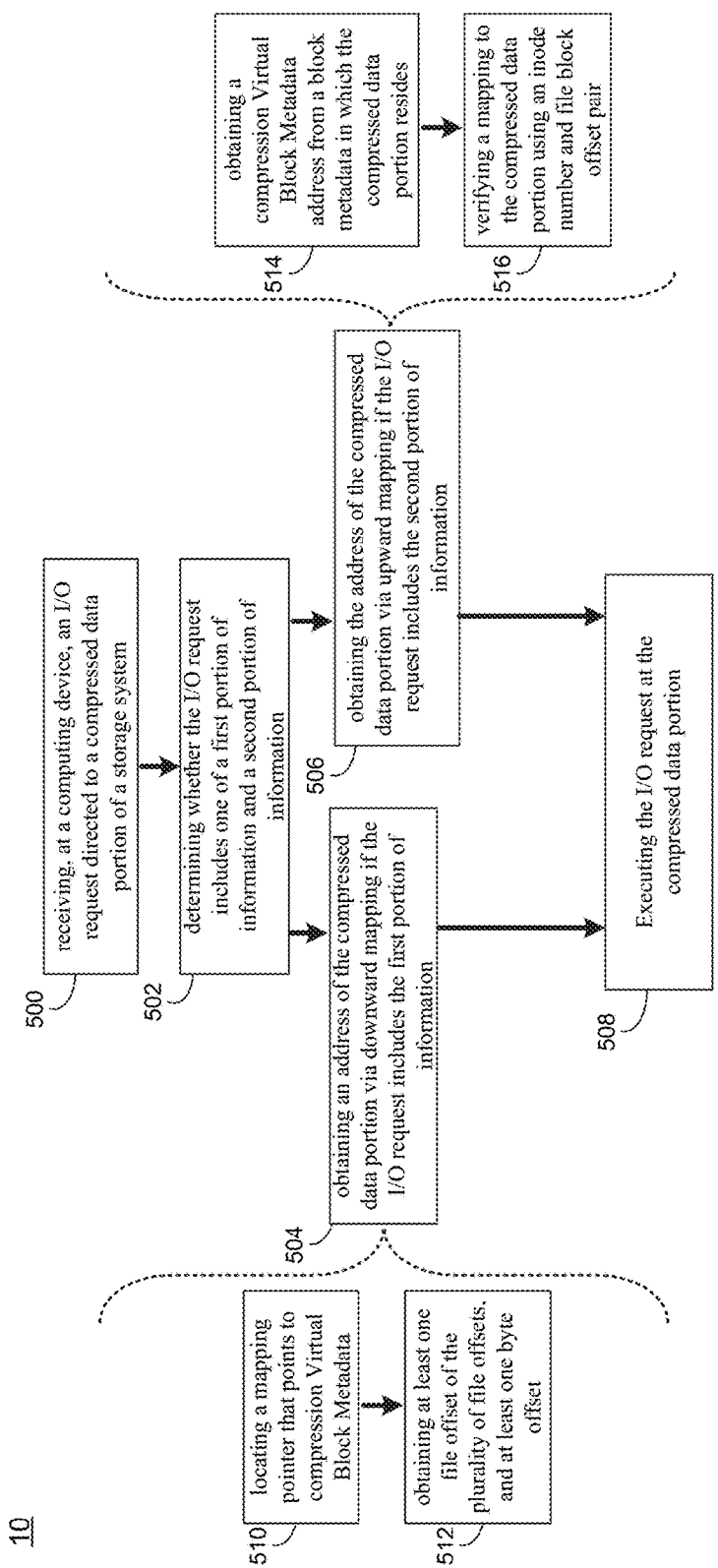
FIG. 5 is an example flowchart of a mapping process according to one or more example implementations of the disclosure.
Figure 6:
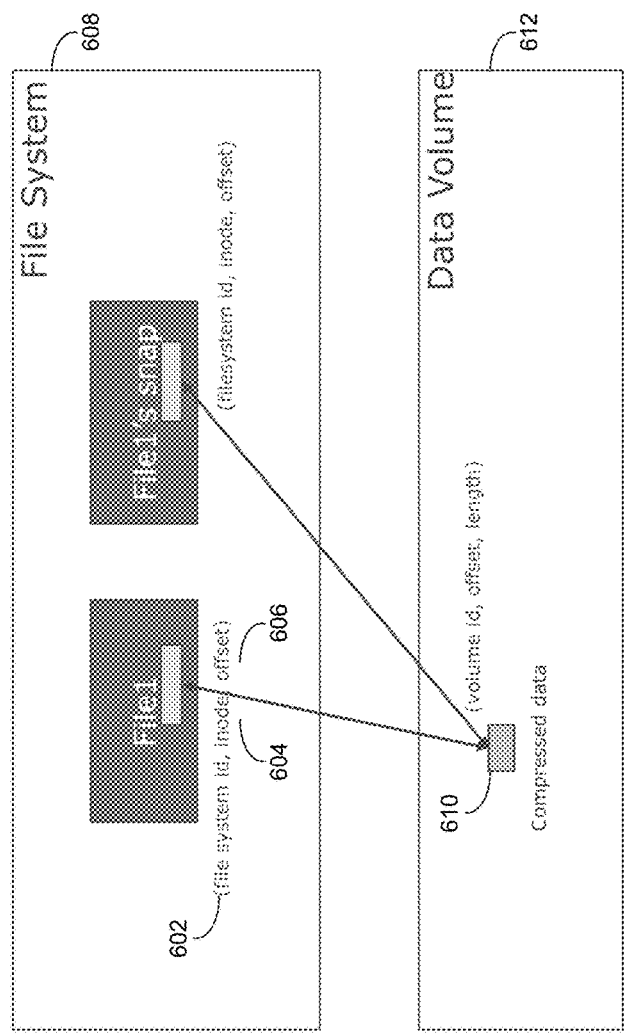
FIG. 6 is an example diagrammatic view of an example storage system layout according to one or more example implementations of the disclosure.
Figure 7:
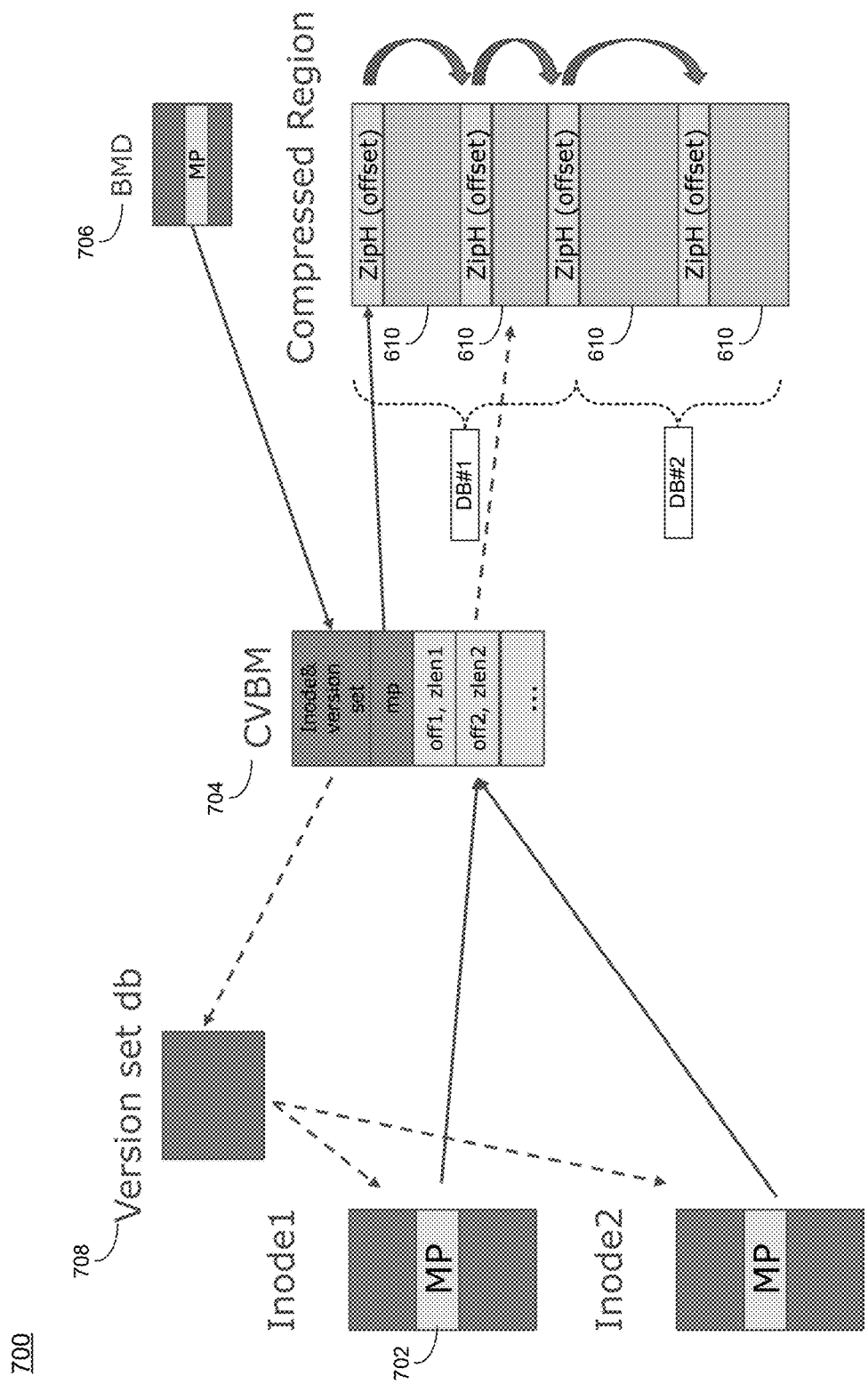
FIG. 7 is an example diagrammatic view of an example storage system layout according to one or more example implementations of the disclosure.

The Mapping Process:

As discussed above and referring also at least to the example implementations of FIGS. 5-7, mapping process 10 may receive 500, at a computing device, an I/O request directed to a compressed data portion of a storage system. Mapping process 10 may determine 502 whether the I/O request includes one of a first portion of information and a second portion of information. Mapping process 10 may obtain 504 an address of the compressed data portion via downward mapping if the I/O request includes the first portion of information. Mapping process 10 may obtain 506 the address of the compressed data portion via upward mapping if the I/O request includes the second portion of information. Mapping process 10 may execute 508 the I/O request at the compressed data portion.

In some implementations, mapping process 10 may receive 500, at a computing device, an I/O request directed to a compressed data portion of a storage system. For instance, assume for example purposes only that a user (e.g., user 46) has sent an I/O (e.g., I/O request 15) directed to the compressed data portion shown in the example storage system layout 600 of FIG. 6, and example storage system layout 700 of FIG. 7. In the example, I/O request 15 may be received 500 by mapping process 10.

In some implementations, mapping process 10 may determine 502 whether the I/O request includes one of a first portion of information and a second portion of information. For instance, and referring at least to the example implementation of FIG. 6, an example storage system layout 600 is shown. In some implementations, the first portion of information may include a file system ID (e.g., file system ID 602), an inode number (e.g., inode number 604), and a file block offset (e.g., file block offset 606). Thus, in the example, mapping process 10 may receive 500 an I/O request (e.g., I/O request 15), and may analyze the content of the I/O request to determine 502 if the I/O request includes file system ID 602, inode number 604, and file block offset 606 associated with, e.g., file system 608.

In some implementations, the second portion of information may include an address of a compressed data block (e.g., DB#1 associated with compressed data 610) in a data volume (e.g., data volume 612). Thus, in the example, as will be discussed below, mapping process 10 may receive 500 an I/O request (e.g., I/O request 15), and may analyze the content of the I/O request to determine 502 if the I/O request includes an address of a compressed data block DB#1 associated with, e.g., data volume 612.

In some implementations, mapping process 10 may obtain 504 an address of the compressed data portion via downward mapping if the I/O request includes the first portion of information. For instance, assume for example purposes only that the received 500 I/O request includes file system ID 602, inode number 604, and file block offset 606. Given, this information, mapping process 10 may obtain 504 the address (e.g., location) of either the compressed data block or non-compressed data block stored in the data volume. For example, assume the following example information is provided in I/O request 15 (e.g., Input: inode1, file_inode_num=9427, file_block_offset=64K bytes). In the example, and in some implementations, obtaining 504 the address of the compressed data portion via downward mapping may include locating 510 a mapping pointer that points to compression Virtual Block Metadata, wherein the compression Virtual Block Metadata may include a ZipHeader with a plurality of file offsets. For instance, mapping process 10 may read the inode structure (e.g., of inode1), and look through each level of IBs (indirect blocks) by file block offset. For example, mapping process 10 may locate 510 the mapping pointer (MP) by reading the data structure of the inode (e.g., inode 9427) from file system 608. In the example, the file block offset of, e.g., 64K is the No. 8 data block (e.g., when using 8K per data block). In the example, mapping process 10 may read the No. 8 MP from the inode structure, where the No. 8 MP stores the address of the compression Virtual Block Metadata (e.g., CVBM (e.g., 0x472)).

Continuing with the above example, mapping process 10 may obtain the MP (e.g., MP 702) that points to the CVBM, where the compressed data may be stored in the compressed region to which the CVBM points, and where each compressed data may have a ZipHeader (ZipH) with different file offsets. In some implementations, mapping process 10 may read the data structure of CVBM (e.g., 0x472) from file system 608, where the CVBM's MP value (e.g., 0x10040) is the address (in blocks) of the compressed region within data volume 612.

In some implementations, obtaining 504 the address of the compressed data portion via downward mapping may further include obtaining 512 at least one file offset of the plurality of file offsets, and at least one byte offset. For example, mapping process 10 may obtain 512 the file offset and byte offset by reading the CVBM structure (e.g., CVBM structure 704), which may store the file offset and byte offset (e.g., within the compressed region) for each compressed data.

In some implementations, mapping process 10 may obtain the address of compressed region 610 from CVBM structure 704 and may obtain the address of compressed data within the compressed region by searching the file offset in CVBM structure 704. For instance, assume for example purposes only that CVBM structure 704 has 4 extents, with a file offset value of extent#2 being, e.g., 64K, which is the same as the file block offset. Thus, in the example, extent#2 is mapping to the compressed data that is ultimately referenced by I/O request 15.

In some implementations, the length value of extent#2 (e.g., 0x8) may be the length of compressed data in sectors. In the example, the offset of compressed data within the compressed region may be sum of the length of all its previous compressed data, e.g., the length of extent#1 (e.g., 0x4). As each block (e.g., 8 KB) may have 16 sectors (e.g., 512B), the address of compressed data in this example may be: 0x10040*16+0x4=0x100404 sectors (or 0x20080800 bytes). With the above address information, mapping process 10 may obtain 504 the address of the compressed data in the data volume ultimately referenced by I/O request 15, with the example final output as follows:
compressed_data_address=0x100404 sectors or 0x20080800 bytes
compressed_data_length=0x8 sectors or 4096 bytes In some implementations, mapping process 10 may obtain 506 the address of the compressed data portion via upward mapping if the I/O request includes the second portion of information. For instance, as noted above, the second portion of information may include an address of a compressed data block (e.g., DB#1 associated with compressed data 610) in a data volume (e.g., data volume 612). Assume for example purposes only that the received 500 I/O request includes the address of the compressed data block in data volume 612. Given, this information, mapping process 10 may obtain 506 the address (e.g., location) of either the compressed data block or non-compressed data block stored in the data volume (e.g., via the file system ID and inode number of the file that holds the compressed data and its block offset within the file). For example, assume the following example information is provided in I/O request 15 (e.g., Input: compressed_data_address=0x100404 sectors). In some implementations, there may be multiple files (e.g., inode files) that hold the compressed data due to file snapshot technology, thus, mapping process 10 may eventually output multiple pairs of (inode number, file offset).

In some implementations, obtaining 506 the address of the compressed data portion via upward mapping may include obtaining 514 a compression Virtual Block Metadata address from a block metadata in which the compressed data portion resides. For example, mapping process 10 may obtain 514 the CVBM address by reading the block metadata (BMD), such as BMD 706, of the block in which the compressed data resides, as the BMD may contain the CVBM address. In the example, sector #0x100404 resides in block #0x10040 (e.g., when using 16 sectors per block). In some implementations, every data block may have a BMD, which in the example may be read from the BMD of block#0x10040. In some implementations, BMD 706 may contain an MP (e.g., 0x472) pointing to CVBM 704.

In some implementations, obtaining 506 the address of the compressed data portion via upward mapping may further include verifying 516 a mapping to the compressed data portion using an inode number and file block offset pair. For instance, mapping process 10 may read CVBM structure 704 to obtain the address of the compressed region, and then may obtain the offset of the compressed data within the compressed data region. For example, mapping process 10 may read the data structure of CVBM 704 (e.g., 0x472) from file system 608. In the example, the CVBM's MP value (e.g., 0x10040) is the address of the compressed region within data volume 612.

In the example, by searching the above-noted offset obtained via the address of the compressed region (located by reading the CVBM), mapping process 10 may obtain the file offset of the compressed data. In the example, the address of the compressed data is 0x100404 sectors, so the offset of the compressed data within the compressed region is 4 sectors (e.g., 0x100404-0x10040*16). Continuing with the example, mapping process 10 may read the version set ID from CVBM 704, and may obtain a collection of inode numbers from a version set db (e.g., version set db 708). In some implementations, for each inode number, mapping process 10 may (as noted above for downward mapping) read the inode structure (e.g., of inode1), and look through each level of IBs (indirect blocks) by file block offset and obtain the MP (e.g., MP 702) that points to the CVBM. In the example, mapping process 10 may look into 4 extents in the CVBM, as first extent's length is, e.g., 4 sectors, so the second extent is mapping to the compressed data (e.g., 0x100404). In the example, the second extent's file offset (e.g., 64K) is the offset of the data within the file. The value of the VersionSetID in CVBM 704 may be the identity of the version set, which may be a group of inode numbers of the file and all its snaps. By searching the VersionSetDB (e.g., stored in file system 608) with the VersionSetID, mapping process 10 may obtain three inode numbers: e.g., 9426, 9427, and 9428. In the example, all three of these inodes may possibly contain the compressed data ultimately referenced by I/O request 15, and as such, mapping process 10 may verify 516 them one by one.

For example, if the CVBM address is the same as the CVBM address obtained by reading the MBD of the block in which the compressed data resides, the pair (inode number, file block offset) is mapping to the compressed data block. In the example, mapping process 10 may read the data structure of the inode (e.g., 9426), and since mapping process 10 has already obtained the file offset (e.g., 64K) as discussed above, mapping process 10 may read the No. 8 MP from the inode structure.

In the example, the address in the No. 8 MP (e.g., 0x471) is not equal to the CVBM address (e.g., 0x472), thus, inode 9426 does not contain the compressed data referenced in I/O request 15. Mapping process 10 may read the data structure of the next inode (e.g., 9427) by reading the No. 8 MP from the inode structure. In the example, the address in the No. 8 MP (e.g., 0x472) is equal to the CVBM address (e.g., 0x472), thus, inode 9427 does contain the compressed data referenced in I/O request 15. Mapping process 10 may read the data structure of the next inode (e.g., 9428) by reading the No. 8 MP from the inode structure. In the example, the address in the No. 8 MP (e.g., 0x472) is equal to the CVBM address (e.g., 0x472), thus, inode 9428 does contain the compressed data referenced in I/O request 15. Thus, mapping process 10 may obtain 506 the address of the compressed data in the data volume ultimately referenced by I/O request 15, where there are, e.g., two file data blocks mapping to the compressed data, with the example final outputs as follows:
file_inode_num=9427, file_block_offset=64K bytes
file_inode_num=9428, file_block_offset=64K bytes In some implementations, mapping process 10 may execute 508 the I/O request at the compressed data portion. For example, by obtaining 504/506 the address of the compressed data in the data volume ultimately referenced by I/O request 15 via downward/upward mapping, the data ultimately referenced by I/O request 15 (e.g., read/write) may be executed.

In some implementations, mapping process 10 may be used, e.g., to troubleshoot DMC issues related to an (inline) compression feature. For instance, when DMC happens, DMC detection software (which may be included as part of mapping process 10) may give the location of the mis-compared data in the file system layer. By utilizing mapping process 10, a DMC auto-analyzer may be able to find the location of mis-compared compressed data in the data volume layer. Additionally, as another example, when a corrupted compressed data block is detected, mapping process 10 may find some or all of the affected files, and may recover/restore those specific files (e.g., from a backup system).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, at a computing device, an I/O request directed to a compressed data portion of a storage system;
   determining whether the I/O request includes one of a first portion of information and a second portion of information;
   obtaining an address of the compressed data portion via downward mapping if the I/O request includes the first portion of information;
   obtaining the address of the compressed data portion via upward mapping if the I/O request includes the second portion of information; and
   executing the I/O request at the compressed data portion.

2. The computer-implemented method of claim 1 wherein the first portion of information includes a file system ID, an inode number, and a file block offset.

3. The computer-implemented method of claim 2 wherein obtaining the address of the compressed data portion via downward mapping includes locating a mapping pointer that points to compression Virtual Block Metadata, wherein the compression Virtual Block Metadata includes a ZipHeader with a plurality of file offsets.

4. The computer-implemented method of claim 3 wherein obtaining the address of the compressed data portion via downward mapping further includes obtaining at least one file offset of the plurality of file offsets, and at least one byte offset.

5. The computer-implemented method of claim 1 wherein the second portion of information includes an address of a compressed data block in a data volume.

6. The computer-implemented method of claim 5 wherein obtaining the address of the compressed data portion via upward mapping includes obtaining a compression Virtual Block Metadata address from a block metadata in which the compressed data portion resides.

7. The computer-implemented method of claim 6 wherein obtaining the address of the compressed data portion via upward mapping further includes verifying a mapping to the compressed data portion using an inode number and file block offset pair.

8. A computer program product residing on a non-transitory computer readable storage medium having a plurality of instructions stored thereon which, when executed across one or more processors, causes at least a portion of the one or more processors to perform operations comprising:
   receiving an I/O request directed to a compressed data portion of a storage system;
   determining whether the I/O request includes one of a first portion of information and a second portion of information;
   obtaining an address of the compressed data portion via downward mapping if the I/O request includes the first portion of information;
   obtaining the address of the compressed data portion via upward mapping if the I/O request includes the second portion of information; and
   executing the I/O request at the compressed data portion.

9. The computer program product of claim 8 wherein the first portion of information includes a file system ID, an inode number, and a file block offset.

10. The computer program product of claim 9 wherein obtaining the address of the compressed data portion via downward mapping includes locating a mapping pointer that points to compression Virtual Block Metadata, wherein the compression Virtual Block Metadata includes a ZipHeader with a plurality of file offsets.

11. The computer program product of claim 10 wherein obtaining the address of the compressed data portion via downward mapping further includes obtaining at least one file offset of the plurality of file offsets, and at least one byte offset.

12. The computer program product of claim 8 wherein the second portion of information includes an address of a compressed data block in a data volume.

13. The computer program product of claim 12 wherein obtaining the address of the compressed data portion via upward mapping includes obtaining a compression Virtual Block Metadata address from a block metadata in which the compressed data portion resides.

14. The computer program product of claim 13 wherein obtaining the address of the compressed data portion via upward mapping further includes verifying a mapping to the compressed data portion using an inode number and file block offset pair.

15. A computing system including one or more processors and one or more memories configured to perform operations comprising:
   receiving an I/O request directed to a compressed data portion of a storage system;

determining whether the I/O request includes one of a first portion of information and a second portion of information;

obtaining an address of the compressed data portion via downward mapping if the I/O request includes the first portion of information;

obtaining the address of the compressed data portion via upward mapping if the I/O request includes the second portion of information; and executing the I/O request at the compressed data portion.

16. The computing system of claim 15 wherein the first portion of information includes a file system ID, an inode number, and a file block offset.

17. The computing system of claim 16 wherein obtaining the address of the compressed data portion via downward mapping includes locating a mapping pointer that points to compression Virtual Block Metadata, wherein the compression Virtual Block Metadata includes a ZipHeader with a plurality of file offsets.

18. The computing system of claim 17 wherein obtaining the address of the compressed data portion via downward mapping further includes obtaining at least one file offset of the plurality of file offsets, and at least one byte offset.

19. The computing system of claim 15 wherein the second portion of information includes an address of a compressed data block in a data volume.

20. The computing system of claim 19 wherein obtaining the address of the compressed data portion via upward mapping includes obtaining a compression Virtual Block Metadata address from a block metadata in which the compressed data portion resides and verifying a mapping to the compressed data portion using an inode number and file block offset pair.

* * * * *